3,262,851
PHARMACOLOGICAL COMPOSITIONS CONTAINING GLYCYRRHETINIC ACID DERIVATIVE
Siegfried Gottfried, Ilford, and Lily Baxendale, London, England, assignors to Biorex Laboratories Limited, London, England, a corporation of the United Kingdom
No Drawing. Original application June 26, 1958, Ser. No. 744,668, now Patent No. 3,070,623, dated Dec. 25, 1962. Divided and this application Sept. 27, 1962, Ser. No. 232,634
Claims priority, application Great Britain, July 16, 1957, 22,556/57
4 Claims. (Cl. 167—65)

This is a division of application Serial No. 744,668, filed June 26, 1958, now U.S. Patent No. 3,070,623, granted December 25, 1962.

The present invention is concerned with new pharmaceutical and therapeutic compositions containing derivatives of glycyrrhetinic acid.

Glycyrrhetinic acid is obtainable from liquorice root. Compositions containing glycyrrhetinic acid and having a pronounced effect in suppressing inflammation are known. The said compositions are suitable for topical application, glycyrrhetinic acid being only sparingly soluble in water. We have now found certain derivatives of glycyrrhetinic acid which also have a good effect in suppressing inflammation, and yet are more soluble generally, especially in body fluids, than glycyrrhetinic acid, and are, therefore, more suitable for systemic use than is glycyrrhetinic acid.

According to the invention, there are provided new pharmaceutical and therapeutic compositions containing, as active ingredient, a pharmaceutically effective amount of an ester or hemi-ester of glycyrrhetinic acid, more especially glycyrrhetinic acid propionate (propionyl glycyrrhetinic acid) or glycyrrhetinic acid hydrogen succinate (2-carboxyethylpropionyl glycyrrhetinic acid) or an alkali metal salt of such ester or hemi-ester, which is non-toxic and compatible with mammals.

The derivatives of glycyrrhetinic acid used can be prepared in the manner described in copending application Serial No. 744,668, filed June 26, 1958 (now U.S. Patent No. 3,070,623) of which the present application is a division.

The new compositions have a good effect in suppressing inflammation and comprise the active ingredients in admixture with inert carriers, to form, for example, an ointment, powder, or emulsion. Further, the new compositions may also comprise the active ingredients dissolved in suitable solvents, such as water, normal saline or oils, such compositions being suitable for, for example, oral, subcutaneous, intramammary, intra-muscular, intra-articular, intra-peritoneal and intravenous use.

Medical, pharmacological, and veterinary tests and trials have been carried out with these new compositions on human beings, small and large animals, as well as pharmacological trials using rats, mice, guinea pigs, rabbits and cats. The new compositions are useful in suppressing inflammation and in combating inflammatory conditions such as inflammatory and ulcerative conditions of the digestive system, inflammatory conditions of the mouth, etc.

The new compositions may, in addition to the aforesaid glycyrrhetinic acid derivatives, also contain antibiotic drugs (such as neomycin), keratoplastic drugs, (such as coal tar), keratolytic drugs, (such as salicyclic acid), analgesics, antiseptics, bacteriocides, chemotherapeutics, bacteriostatics, anti-histaminics, sedatives, fungicides, insecticides, corticosteroids, and xanthoglabrol.

As has already been indicated, these new compositions can be in various therapeutic forms, such as, ointments, solutions, injections, emulsions, suspensions, pastes, cones, cerates, paints, powders, and implants, all in conjunction with suitable carriers.

The following examples are given for the purpose of illustrating the present invention.

*Example 1.—Glycyrrhetinic acid propionate (propionyl glycyrrhetinic acid)*

To a solution of 14.1 grams of glycyrrehetinic acid in 24 cc. of dry pyridine were added 4.7 grams of propionic anhydride. The solution was heated for two hours on a boiling water bath and left to cool overnight. A paste of crystals was obtained. This was shaken with chloroform and much water and the aqueous layer rejected:. The chloroform solution was repeatedly extracted with excess of very dilute hydrochloric acid and later with cold water. Evaporation gave the desired propionate as a solid which crystallised from ethylene glycol monoethyl ether in shining leaflets, M.P. 293–295° with previous softening, and having $[\alpha]_D^{20}$ +139° in chloroform. The alkali metal salts of propionyl glycyrrhetinic acid or the salts of the latter with organic bases may be prepared.

*Example 2.—Glycyrrhetinic acid hydrogen succinate (2-carboxyethylpropionyl glycyrrhetinic acid)*

23.5 grams of glycyrrhetinic acid were dissolved in 50 cc. of dry pyridine. A solution of 6.0 grams of succinic anhydride in 30 cc. of dry pyridine was added, followed by 30 cc. of dry triethylamine and then, for washing purposes, 5 cc. of dry pyridine. The solution was heated on a boiling water bath for ten hours and then poured into excess to dilute hydrochloric acid and ice. The fine grey precipitate formed was filtered off, washed with water, dissolved in chloroform, and the solution repeatedly extracted with dilute hydrochloric acid and later with water. It was dried over sodium sulphate and evaporated to dryness. Crystallisation from methanol, using charcoal to effect decolorisation, gave the hydrogen succinate as cream-coloured crystals, M.P. 291–294°, with previous softening, and $[\alpha]_D^{20}$ +128° in chloroform. The alkali metal salts of glycyrrhetinic acid hydrogen succinate and of the latter with organic bases may be prepared.

*Example 3.—Disodium salt of glycyrrhetinic acid hydrogen succinate (glycyrrhetinic acid hemisuccinate, sodium)*

One molecular proportion of glycyrrhetinic acid hydrogen succinate was ground with a dilute (five percent) aqueous solution containing two molecular proportions of sodium hydroxide. The solution was filtered and evaporated in vacuum over concentrated sulphuric acid. The sodium salt is then obtained as a creamy white water-soluble solid.

*Example 4*

An ointment was prepared by dissolving 2% by weight of propionyl glycyrrhetinic acid and 5% by weight of neomycin sulphate in a "Vaseline" (registered trade mark) base. The base can also be made from 8% by weight of nonionic emulsifying wax B.P.C. and 16% by weight of liquid paraffin in water. Similar ointments can be prepared by replacing propionyl glycyrrhetinic acid by an equal weight of the disodium salt of glycyrrhetinic acid hydrogen succinate.

*Example 5*

Ointments were prepared as described in Example 4 in which the neomycin sulphate was replaced by an equal amount of cetrimide.

*Example 6*

A dusting powder was prepared by intimately mixing 1% by weight of glycyrrhetinic acid hydrogen succinate and 0.1% by weight of diphenylhydramine hydrochloride in lactosum.

Example 7

Tablets were prepared containing 0.1 g. glycyrrhetinic acid hydrogen succinate in amylum.

Example 8

An ointment was prepared with a base similar to that disclosed in British Patent No. 26,332/57, with 1% by weight of glycyrrhetinic acid propionate, 2% by weight of cinchocaine, 2% by weight of amethocaine and 0.5% by weight of neomycin sulphate.

Example 9

An implant was prepared by fusion compression of 0.1 mg. glycyrrhetinic acid hydrogen succinate.

What is claimed is:

1. A pharmaceutical composition comprising a minor but anti-inflammatorily effective amount of a glycyrrhetinic acid derivative selected from the group consisting of hemi-esters of glycyrrhetinic acid and the alkali salts thereof which are non-toxic and compatible with mammals, and a major amount of an inert pharmaceutical carrier.

2. A pharmaceutical composition comprising a minor but anti-inflammatorily effective amount of a glycyrrhetinic acid derivative selected from the group consisting of hemi-esters of glycyrrhetinic acid and the salts thereof which are non-toxic and compatible with mammals, and at least one member selected from the group consisting of antibiotics, keratoplastics, keratolytics, corticosteroids, analgesics, xanthoglabrol, bactericides, bacteriostatics, chemotherapeutics, antihistaminics, sedatives, fungicides and insecticides, and a major amount of an inert pharmaceutical carrier.

3. A composition according to claim 1, wherein the glycyrrhetinic acid derivative is glycyrrhetinic acid hydrogen succinate.

4. A composition according to claim 3, wherein the glycyrrhetinic acid hydrogen succinate is present in an amount of 0.1 to 100 milligrams per dosage unit.

References Cited by the Examiner

Adamson et al., British Med. Jour., Dec. 17, 1955, p. 1501.

Chemical Abstracts, 35:41595, 1941 (abstract of Japanese 133, 835, December 14, 1939).

The Merck Index, 7th edition, 1960, pp. 492, 711, 917, 227, 675, 531, 379 and 342.

Mitchell, Manufacturing Chemist, May 1956, vol. 27:5, pp. 169–172.

JULIAN S. LEVITT, *Primary Examiner.*

FRANK CACCIAPAGLIA, *Examiner.*

EUGENE FRANK, *Assistant Examiner.*